United States Patent
Rácz et al.

(10) Patent No.: US 8,380,196 B2
(45) Date of Patent: Feb. 19, 2013

(54) HANDOVER USING DEDICATED RESOURCES RESERVED FOR A LIMITED TIME INTERVAL

(75) Inventors: András Rácz, Budapest (HU); Gunnar Mildh, Sollentuna (SE); Joakim Bergström, Stockholm (SE); Magnus Lindström, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 483 days.

(21) Appl. No.: 12/597,839

(22) PCT Filed: Feb. 27, 2008

(86) PCT No.: PCT/SE2008/050222
§ 371 (c)(1),
(2), (4) Date: Feb. 25, 2010

(87) PCT Pub. No.: WO2008/133579
PCT Pub. Date: Nov. 6, 2008

(65) Prior Publication Data
US 2010/0197308 A1    Aug. 5, 2010

(30) Foreign Application Priority Data
Apr. 27, 2007 (SE) .................................. 0701038

(51) Int. Cl.
*H04W 36/00* (2009.01)
(52) U.S. Cl. .................... 455/436; 455/438; 455/502
(58) Field of Classification Search .................. None
See application file for complete search history.

(56) References Cited

U.S. PATENT DOCUMENTS

| | | | | |
|---|---|---|---|---|
| 6,847,826 | B1* | 1/2005 | Wesby et al. | 455/502 |
| 7,397,790 | B2* | 7/2008 | Zeira et al. | 370/352 |
| 2001/0046240 | A1* | 11/2001 | Longoni et al. | 370/503 |
| 2007/0184865 | A1* | 8/2007 | Phan et al. | 455/509 |

OTHER PUBLICATIONS

3GPP; Nokia. Non-Contention Based Handover Execution. 3GPP TSG-RAN WG2 Ad-hoc on LTE. Agenda Item: 11, R2-061848. Canne, France. Jun. 27-30, 2006.
3GPP; Huawei. Transmission of Combinable MCCH in LTE. 3GPP TSG-RAN WG2 #59, Agenda Item: 4.7.1. R2-073283. Athens, Greece. Aug. 20-24, 2007.
3GPP. $3^{rd}$ Generation Partnership Project: Technical Specification Group Radio Access Network; UTRAN Iub/Iur User Plane Protocol for DCH Data Streams (Release 7). 3GPP TS 25.427 v7.4.0 (Mar. 2007).

* cited by examiner

*Primary Examiner* — Erika A Washington

(57) ABSTRACT

A method and arrangement for handover wherein the handover resource (the dedicated random access preamble) is reserved by the target radio base station (RBS) for a limited period of time, thus increasing the handover efficiency and thereby allowing random access preambles to be used for initial access to a larger extent. The information about the reserved time interval is sent to the UE in the handover command message by means of a frame number offset between the source RBS and the target RBS. The UE uses the information to calculate when to send its synchronization message to the target RBS. The frame number offset is calculated either by source RBS or by target RBS.

24 Claims, 12 Drawing Sheets

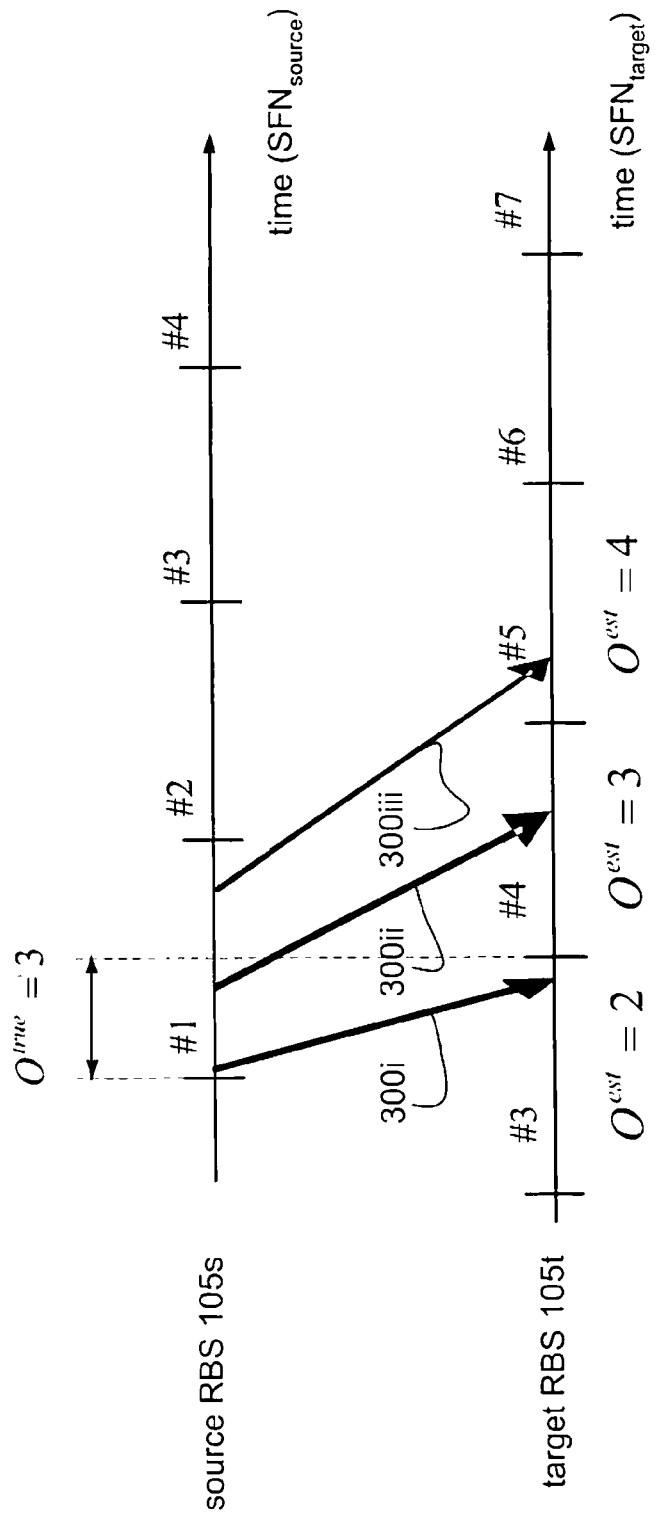

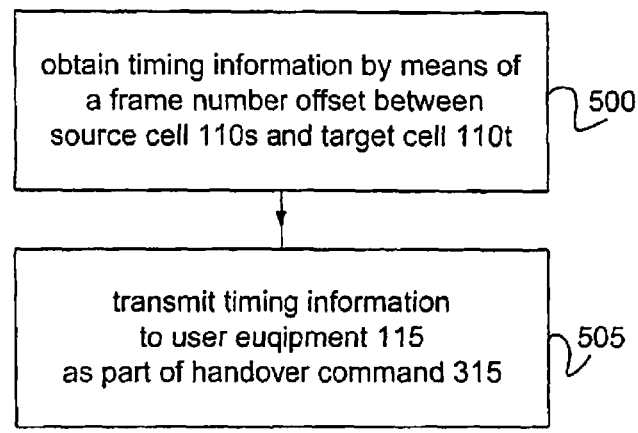

HANDOVER USING DEDICATED RESOURCES RESERVED FOR A LIMITED TIME INTERVAL

TECHNICAL FIELD

The present invention relates to mobile radio communications systems and in particular to the handover of a user equipment from one cell to another in such systems.

BACKGROUND

A mobile radio communications system is generally divided into a number of cells, where a cell serves a particular geographical area. Within a cell, there is provided a radio base station via which a user equipment, present in the cell, may communicate. A user equipment may move from cell to cell, and, if the user equipment is engaged in communication upon crossing of a cell border, a handover should be performed from the radio base station in the cell exited, referred to as the source cell, to a base transceiver station in the entered cell, referred to as the target cell. A handover between cells may also be initiated for a user equipment that does not move, for example if the radio base station with which the user equipment is communicating experiences a high traffic load and the transmission circumstances in the neighbouring cell are more favourable.

In a system based on the Long Term Evolution (LTE) standard, a so called Random Access (RA) preamble is transmitted at handover by a user equipment on the Random Access CHannel (RACH) to identify to the target cell that the user equipment requires access to the target cell in order to complete the handover, as described for example in the $3^{rd}$ Generation Partnership Project Technical Specification (3GPP TS) 36.300 vs. 8.0.0. A RA preamble is a pre-defined signalling sequence. RA preambles are also used for example for random access of non-active user equipments which access a cell and for which time alignment is required. There are a limited number of RA preambles available in a cell, and a RA preamble can only be successfully used by one user equipment in the cell at a time.

Hence, there is a risk of a shortage of RA preambles. If there is no RA preamble available for a user equipment for which handover should be performed, the handover will be delayed, with an increasing risk of handover failure. Similarly, if there is no RA preamble available for a non-active user equipment attempting to access a cell, the access attempt will be delayed. Not only may the delays result in reduced quality of service, but may even result in radio link failure.

SUMMARY

A problem to which the present invention relates is how to achieve resource efficient handover signalling in a mobile radio communications system.

This problem is addressed by a first method of performing handover of a user equipment (115) from a source radio base station (105s) to a target radio base station (105t) in a mobile radio communications system (100), wherein a handover command (315) comprising information relating to resources reserved for the handover is sent to the user equipment from the source radio base station. The handover command further comprises timing information relating to the timing of the reserved resources: where the timing information is obtained by means of a frame number offset between the source cell and the target cell. This first method is typically performed by a source radio base station upon handover.

The problem is further addressed by a second method for performing handover of a user equipment (115) from a source radio base station (105s) to a target radio base station (105t) in a mobile radio communications system (100, wherein handover resources (Pn) are reserved for the handover in the target radio base station upon receipt of a handover request message (300). The resources (Pn) are reserved for the handover for a limited time period; and information relating to the timing of the reserved resources is transmitted to the source radio base station in a second message (310) in order for the source radio base station to communicate the timing of the reserved resources to the user equipment. This second method is typically performed by a target radio base station upon handover.

The problem is yet further addressed by a third method of performing handover of a user equipment (115) from a source radio base station (105) to a target radio base station (105) in a mobile radio communications system (100), wherein a handover command (315) comprising information relating to resources reserved for the handover is received (800) by the user equipment from the source radio base station. The handover command received by the user equipment further comprises timing information relating to the timing of the reserved resources, wherein the timing information has been obtained by means of a frame number offset between the source cell and the target cell. The method comprises: determining (805), based on the timing information, a time interval for which the reserved resources are reserved for the handover of the user equipment; and transmitting (810) a synchronisation message (320) to the target radio base station within said determined time interval using said reserved resources. This third method is typically performed by a user equipment upon handover.

By the inventive methods is achieved that the handover resources, for example a dedicated preamble or a dedicated access channel, can be used more efficiently. By allocating the handover resource to the handover of a particular user equipment for a limited period of time, and communicating timing information of the reserved resources to the user equipment, the risk that the handover resources will be allocated for a long period of time in a target radio base station to which handover of the user equipment will never occur, or to a handover procedure that has failed, will be eliminated. Hence, the use of the handover resources will be more efficient.

In an embodiment of the invention, the first method includes the sending of information on a first source frame number to the target radio base station in a first message (300), where the first source frame number is the frame number of the source radio base station upon sending said information on the first source frame number; and receiving first target frame number information from the target radio base station in a second message (310), wherein the first target frame number information has been obtained by the target radio base station by determining a first target frame number as the frame number of the target radio base station upon receipt of the first message. The second method correspondingly includes the receiving of the first message, and the sending of the first target frame number information. In this embodiment, the frame number offset can be obtained from the first source frame number and the target source frame number. The first message may advantageously be a handover request message, and the first target frame number information may advantageously be transmitted in a handover response message. In this way, the frame number offset may be determined without the introduction of any extra messages into the signalled between nodes in the mobile radio communications network, i.e. without any significant increased use of the available transmission resources.

The invention is also addressed by a radio base station, a user equipment and computer program products.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates different possible results of a frame number offset estimation when there is a phase shift between the stream of source frames and the stream of target frames.

FIG. 5 illustrates a method according to the invention.

DETAILED DESCRIPTION

Figure 1:
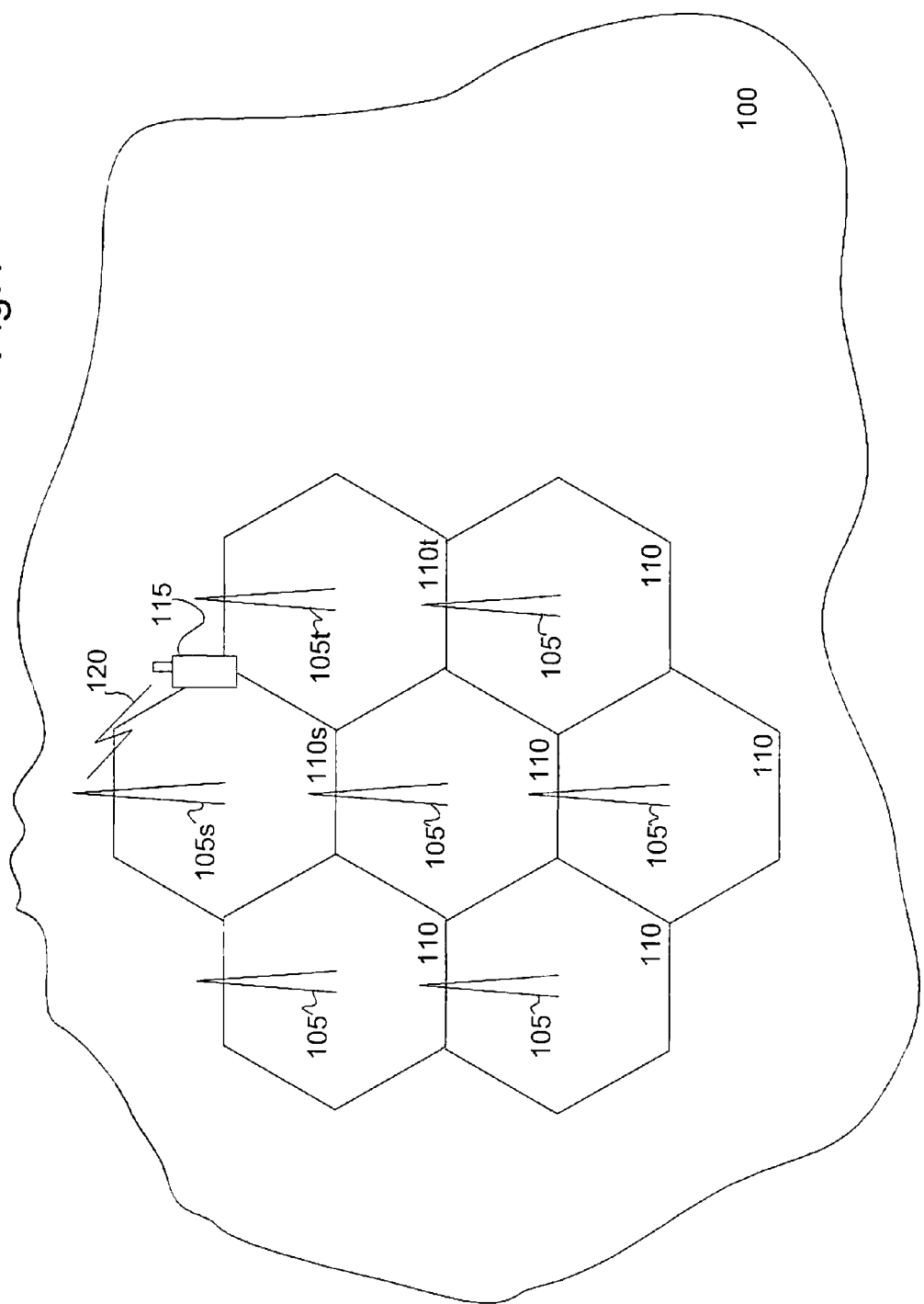
FIG. 1 is a schematic illustration of a mobile radio communications system.

A mobile radio communications system 100, hereinafter referred to as system 100, is schematically illustrated in FIG. 1. The system 100 is shown to comprise a number of radio base stations 105, each serving a cell 110. A radio base station (RBS) 105 could for example be an eNodeB in a system 100 based on the Long Term Evolution (LTE) standard. a radio base station in a system 100 based on the Global System for Mobile Communications (GSM) standard, or any other type of radio base station. A user equipment (UE) 115 is shown to communicate within the system 100 via one of the radio base stations 105, referred to as the source radio base station 105s, over a radio interface 120. In a scenario described below, the user equipment 115 will be handed over from the source radio base station 105s to another of the radio base stations 105, denoted 105t and in the following referred to as target radio base station 105t. A radio base station 105 can generally serve both as a source radio base station 105s and a target radio base station 105t in different handover procedures.

As discussed above, there is a desire to find handover procedures that more efficiently use the available resources. Examples of resources that may be used for a handover procedure, hereinafter referred to as handover resources, or simply as resources, can be a dedicated access channel, used for example in GSM systems, and RA preambles, used for example in systems based on the LTE standard.

The reserved handover resources could advantageously be selected from resources that are dedicated to handover procedures. In a LTE system 100, for example, such handover resource could be a RA preamble, selected out of a group of RA preambles referred to as dedicated preambles and which can be allocated to a handover procedure in order to allow for a contention free handover, c.f. "*Non contention based HO*", 3*GPP TSG-RAN WG2 Meeting #56bis, R*2-070011, Sorrento, Italy, 15-19 Jan. 2007, Agenda item 5.5.1. Such dedicated preambles are not available for selection by a user equipment 115 for random access procedures, but can only be allocated to a user equipment 115 by a node in system 100, such as the target radio base station 105t. RA preambles that are available for selection by a user equipment 115 can be referred to as random RA preambles.

As mentioned above, the total number of RA preambles available in a cell 110 is limited. The more of the available RA preambles that are assigned to be dedicated preambles, the fewer the random RA preambles that are available for non-active user equipments entering the cell 110. Hence, by increasing the number of dedicated preambles in a cell 110, the risk of additional delays in the access time for non-active user equipments trying to access the cell 110 will increase, since the risk will increase that two non-active user equipments 115 accessing the cell 110 at the same time will use the same random RA preamble. The attempt by two (or more) different user equipments 115 to use the same random RA preamble at the same time will lead to collision and failed access, which causes additional delays for the user equipments 115 to access the cell 110. On the other hand, by assigning RA preambles to be dedicated preambles, the handover of user equipments 115 between a cell 110 and its neighbouring cells 110 will be more efficient.

A more efficient usage of available handover resources can be achieved by introducing handover procedures wherein resources are reserved for a particular handover for a limited period of time. By limiting the period of time for which a handover resource is dedicated to the handover of a particular user equipment 115, the handover resources, and thus the available radio resources, can be more efficiently utilised. At times when a handover resource is not reserved for the particular user equipment 115, the resource can be used for other purposes, such as for example for the handover of another user equipment 115.

Figure 2A:
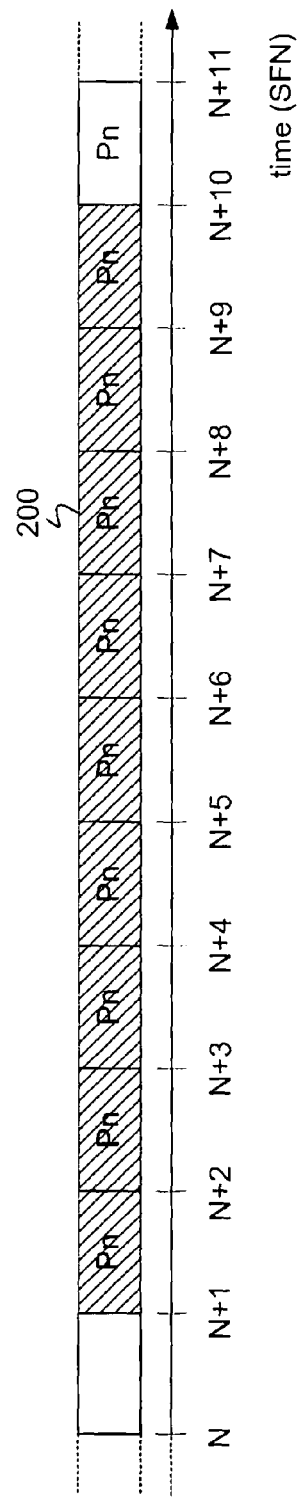
FIG. 2a illustrates a first scenario of reservation of resources for a handover procedure.
Figure 2B:
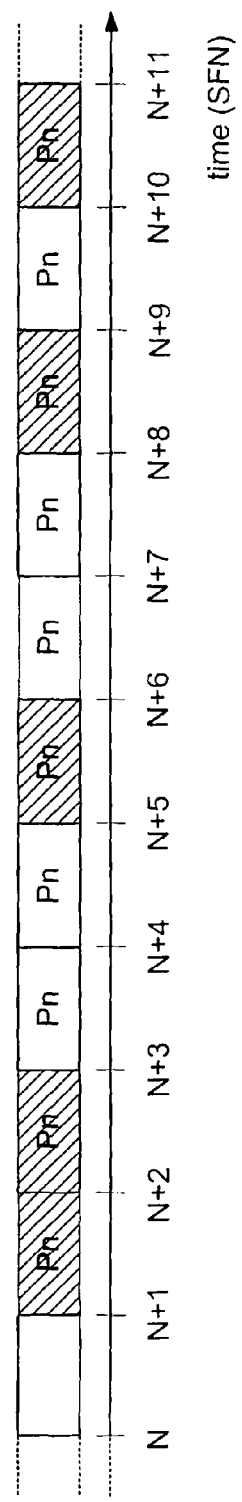
FIG. 2b illustrates a second scenario of reservation of resources for a handover procedure.

In FIG. 2, two different scenarios of occupation of resources used for handover are illustrated. In a system 100, transmission of information is often performed as a stream of frames, wherein each frame is identified by a frame number. In both FIG. 2a and FIG. 2b, a stream of frames 200 is shown. In LTE, the frame number is referred to as the System Frame Number (SFN), as indicated in FIGS. 2a and 2b. However, by System Frame Number, or SFN, should in the following be understood as any frame numbering used in a system 100 of any standard.

FIG. 2a illustrates a situation wherein a dedicated preamble is occupied for the handover of a user equipment 115 until the dedicated preamble is no longer needed for the handover. In the scenario of FIG. 2a, the occupation of a dedicated preamble Pn by the first user equipment 115 is indicated by dashed lines. In this scenario, the time during which the dedicated preamble Pn is occupied by the first user equipment 115 corresponds to nine frames 200. After the duration of these nine frames 200, the dedicated preamble Pn can be used by a second user equipment 115. The occupation of the dedicated preamble Pn by the second user equipment 115 is indicated by solid grey.

In FIG. 2b, on the other hand, a situation is illustrated wherein the period of time during which a dedicated preamble is reserved for a particular user equipment 115 is limited in accordance with the invention. In the scenario of FIG. 2b, the dedicated preamble Pn is reserved for a first user equipment 115 during a time duration corresponding to five frames 200—although these five frames are not consecutive, but are distributed over a period of time corresponding to ten frames. Hence, the period of time during which the first user equipment 115 may attempt handover by use of the dedicated preamble Pn has been increased as compared to the scenario of FIG. 2b, whereas the total number of frames 200 during which the dedicated preamble Pn is occupied by the first user equipment 115 has been significantly reduced. Thus, in the scenario of FIG. 2b, wherein an RA preamble can be intermittently reserved for a particular user equipment 115, is highly efficient in regard of the usage of the dedicated preamble resources. In the scenario of FIG. 2b, the dedicated preamble Pn has been intermittently reserved to three different user equipments 115 during the duration of the nine frames 200 in FIG. 2a during which the dedicated preamble is occupied by the first user equipment 115.

In another scenario (not shown) in accordance with the invention, a dedicated preamble Pn is reserved for the handover of a particular user equipment 115 for a number of consecutive frames 200 corresponding to a limited period of time. Hence, in this scenario, the particular dedicated preamble Pn is not intermittently allocated to other user equipments 115 during the period of time during which the dedicated preamble Pn is reserved for the particular user equipment 115, as opposed to the scenario illustrated in FIG. 2b. However, in this scenario, the allocation of the dedicated preamble Pn to a particular handover procedure is limited in time, as opposed to the scenario of FIG. 2a, wherein a dedicated preamble Pn is allocated to a particular handover procedure for any needed duration of time. It is often the case that handover procedures relating to the handover of the same user equipment 115 are simultaneously initiated in more than one target cell 110t. Hence, by limiting the period of time during which a dedicated preamble is reserved for the handover of a particular user equipment 115 in a target cell 110t, the risk that a dedicated RA pre-amble is occupied during a long period of time for the handover of a user equipment 115 to a target cell 105t or target cells 105t to which handover of the user equipment 115 will never occur, or for a handover procedure that has failed, will be eliminated. Hence, also in this scenario, the efficiency of the usage of handover resources will be greatly improved as compared to the scenario illustrated in FIG. 2a.

In the scenarios described above in relation to FIGS. 2a and 2b, it is assumed that a user equipment 115 knows which time slots (or other transmission resource blocks) within a frame 200 should be used for access, and that the preamble Pn has been reserved for all transmission resource blocks dedicated to access within a time frame 200. However, if desired, the reservation of handover resources could be made on a transmission resource block level, so that a handover resource (e.g. a preamble Pn) is reserved for the handover of a first user equipment in some transmission resource blocks of a frame 200, and possibly to the handover of other user equipment(s) in other transmission blocks of the same frame 200.

It should be noted that different handover resources may be simultaneously reserved in a target cell 110t for the handover of different user equipments 115. For example a first dedicated preamble Pn may be reserved for a first user equipment 115 while a second dedicated preamble Pm may at the same time be reserved for a second user equipment 115, etc.

Figure 3:
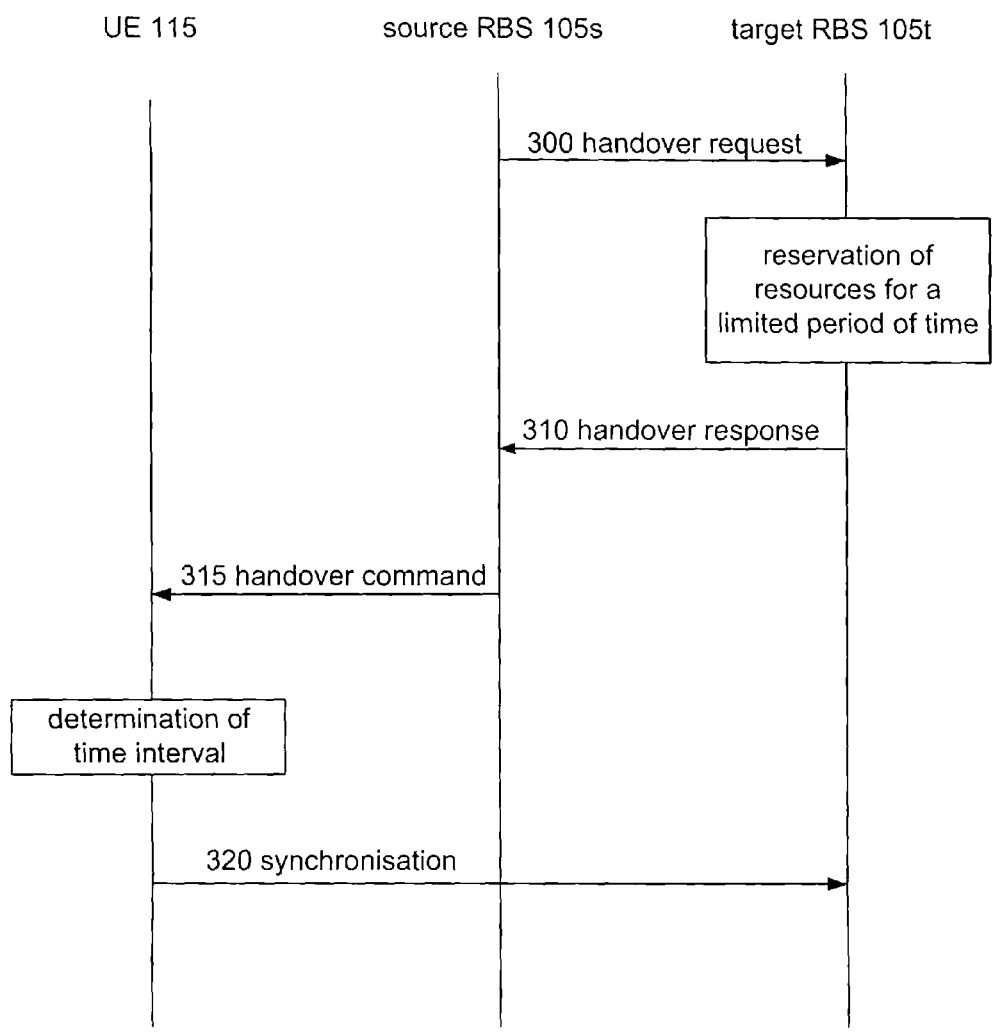
FIG. 3 is a signalling diagram illustrating an exemplary handover preparation signalling scenario according to the invention

A signalling diagram illustrating an exemplary handover preparation signalling scenario according to the invention is shown in FIG. 3. Prior to the scenario illustrated in FIG. 3, a handover decision has been made (generally by the source radio base station 105s), whereby it has been decided that the user equipment 115 of the scenario illustrated in FIG. 3 should be handed over from the source radio base station 105s to a target radio base station 105t.

In the signalling diagram of FIG. 3, a handover request 300 is sent from the source radio base station 105s to the target radio base station 105t as a request for handover preparation. Upon receipt of the handover request 300, the target radio base station 105t reserves resources for the handover of user equipment 115 to the target radio base station 105t. In an LTE system 100, the resources that are reserved is typically a dedicated preamble.

When the target radio base station 105t reserves resources for the handover of user equipment 115, the target radio base station 105t also determines for which time period(s) these resources should be reserved for the handover procedure. Such timing of the reserved resources could advantageously be determined in terms of frames 200 of the radio interface 120t of the target radio base station for which the resources will be reserved for the handover of user equipment 115. As discussed in relation to FIG. 2b, the resources could be reserved for the handover of user equipment 115 during a number of consecutive frames 200, or intermittently, or during one time frame only. Other ways of expressing the timing of the reserved resources may be contemplated, such as expressing the timing in particular strokes of the clock.

During the handover preparation, the target radio base station 105t reserves a dedicated resource, such as for example a dedicated preamble (LTE) or a dedicated access channel (GSM) for handover of the user equipment 115 and indicates the timing of the reserved resource in terms of frame numbers as part of the handover response message 310. In order not to delay the handover execution unnecessarily, the target radio base station 105t could reserve the resource for the earliest available time, but the reservation of the dedicated resource could also be delayed to a later time. This may for example be desirable if the communication of the dedicated preamble to the user equipment 115 takes longer than the duration of a frame 200.

In a handover response message 310 (also referred to as a handover request ack message) sent from the target radio base station 105t to the source radio base station 105s in FIG. 3, information relating to the timing of the reserved resources is included. Timing information relating to the timing of the reserved resources is then sent to the user equipment 115 in a handover command 315 transmitted from the source radio base station 105s to the user equipment 115. The handover command preferably also includes an identification of the reserved resources. Upon receipt of the handover command 315, the user equipment 115 inter alia retrieves the timing information from the handover command 315, and determines, based on the timing information, one or more time intervals during which the handover resource has been reserved for the user equipment 115. The user equipment 115 then transmits a synchronisation message 320, to the target radio base station 105t, during a determined time interval during which the handover resource has been reserved for the user equipment 115. When the reserved handover resource is a dedicated preamble, the synchronisation message 325 includes the dedicated preamble. Upon receipt of the synchronisation message 320, the target radio base station 105t determines the required timing advance of the user equipment 115 in a conventional manner and informs the user equipment of its timing advance in a downlink message (not shown in FIG. 3). A handover confirm message will then generally be sent by the user equipment 115 to the target radio base station 105t.

As mentioned above, the timing of the reserved resources can advantageously be determined by the target radio base station 105t in terms of frames 200 for which the reserved resources have been reserved for the handover of the user equipment 115. Hence, the timing information in the handover command 315 could be expressed in terms of target radio base station frame numbers, referred to as target frame numbers. However, in order for the user equipment 115 to be able to use the timing information included in the handover command 315, the timing information should be expressed in terms of time measure that the user equipment 115 can understand. Since the user equipment 115 is still attached to the source radio base station 105s at the time when the handover command 315 is received by the user equipment 115, the frame numbering of the target radio base station 105t is unknown to the user equipment 115 upon receipt of the handover command 315 (the frame numberings of different radio base stations 105 in a system 100 are generally not the same, but there is likely to be an offset in frame numbering, and possibly also a phase difference between the stream of frames of different radio base stations 105). The frame numbering of the target radio base station 105 could be read by the user equipment 115 upon receipt of the handover command 315 from a broadcast channel transmitted by the target radio base station 105t. However, reading of frame numbering is time consuming, and the user equipment 115 having to read the frame numbering therefore decreases the chances of the handover procedure being performed smoothly, without the user of the user equipment 115 noticing that a handover procedure is taking place, or even worse, increases the risk of radio link failure.

According to the invention, the timing information included in the handover command 315 is obtained by means of a frame number offset between the source radio base station 105s and the target radio base stations 105t. The timing of the reserved resources can then be readily understood by the user equipment 115, since the frame numbering of the source radio base station 105s is known to the user equipment 115. In this way, no reading of the frame numbering in the target cell 110t is needed, and the inclusion of timing information in the handover command 315 will not significantly affect the time required by the handover procedure.

The timing information in the handover command 315 could be expressed in terms of the offset between the frame numbers of the source and target radio base stations 105 in combination with the relevant target frame number(s), so that the user equipment 115 could determine the source frame numbers corresponding to the relevant target frame number (s). Alternatively, the timing information could be expressed directly in terms of the source frame numbering. Alternatively, the timing information could be expressed in relative terms in relation to the frame number of the source frame in which the handover command 315 is sent/received—for example, the timing information could include a number n, by which the user equipment 115 would understand that the reserved resources will be reserved for the n frames following the frame in which the handover command 315 was received. Moreover, when the timing information in the handover command is expressed in terms of a frame number (either target or source frame number), the timing information could, in a system 100 where the frame numbering is cyclic, include only the last digits of a frame number that would be needed in order to safely identify the frame. In this way, transmission of the timing information in the handover command 315 would require less transmission resources.

In order to obtain the timing information by means of the frame number offset between the source and target frame numbers, the offset between the source and target frame number, hereinafter referred to as the frame number offset, will have to be determined.

Let the frame number offset, denoted O, be defined by:

$$SFN_{target} = SFN_{source} + O. \quad (1)$$

Hence, when a value of the frame number offset O is know, the frame number at the target radio base station 105t at any point in time can be obtained from the frame number at the source.

The frame number offset can be determined by including the current frame number of the source radio base station 105s in the handover request message 300, which is sent by the source radio base station 105s to the target radio base station 105t (cf. FIG. 3). This frame number value is denoted as $SFN^{(1)}_{source}$. The frame number at the target radio base station 105t upon the arrival of the handover request message 300 is denoted by $SFN^{(1)}_{target}$.

The following equality then holds:

$$SFN^{(1)}_{target} = SFN^{(1)}_{source} + D + O. \quad (2)$$

where D is the delay of transmission between source and target radio base stations 105 over a transport network connecting the two, expressed in terms of frame numbers. The value of the frame number offset can be calculated as follows, by the target radio base station 105t, based on the $SFN^{(1)}_{source}$ (received in the handover request message 300), under the assumption that the transmission delay D is negligible (or at least less than the frame length):

$$O = SFN^{(1)}_{target} - SFN^{(1)}_{source}. \quad (3)$$

It should be noted that in typical cases, the transmission delay D between radio base stations 105 is expected to be smaller than the length of a frame 200 and therefore, expression (3) will hold.

Once determined, the frame number offset O can advantageously be included in the handover response message 310. Alternatively, the same calculation can be performed by the source radio base station 105s if the handover response message 310 includes $SFN^{(1)}_{target}$ instead of, or together with, the frame number offset O.

It may be noted that since the transmission delay D has been neglected in expression (3), the estimated value of the frame number offset O obtained from expression (3) may be an overestimation of the real offset with at most +1 frame (assuming that D<1 frame). On the other hand, a phase difference between the target frame stream and the source frame stream may result in an error in the target frame number (i.e., when the frame borders do not coincide). If the target frame, coinciding with a particular source frame when there is a phase difference, is defined as the first target frame starting within the duration of the particular source frame, then the error in the target frame number may be an underestimation of the target frame number with maximum one frame. Thus, the estimation obtained from expression (3) may have an error of +/−1 frame. This is illustrated via an example in FIG. 4.

FIG. 4 shows a flow of frames from a source radio base station 105s, as well as a flow of frames from a target radio base station 105t, where a phase difference exists between the source flow of frames and the target flow of frames. In the example of FIG. 4, the true offset difference is O=3 frame lengths. In the figure, the transmission of three different handover request messages 300i, 300ii and 300iii, indicated by means of three different arrows, is illustrated. All three handover request messages 300i, 300ii and 300iii are shown to have been transmitted in a first source time frame, indicated as #1, where handover request message 300i was transmitted at a first point in time, handover request message 300ii at a second point in time, and handover request message 300iii at third point in time. The transmission delay D experienced by handover request message 300iii is shown to be nearly one frame length, whereas the transmission delay D experienced by handover request messages 300i and 300ii of FIG. 4 is considerably less than a frame length.

Depending on the different transmission delays and the different points in time when the handover request messages 300i. 300ii and 300iii were transmitted, the estimated frame number offset $O^{est}$ obtained by expression (3) $O^{est}=2$, $O^{est}=3$ and $O^{est}=4$ based on the different handover request messages 300i, 300ii and 300iii, respectively (the target radio base station 105t takes the next target frame number immediate after the reception of the handover request message 300 as $SFN^{(1)}_{target}$ in expression (3)).

Hence, depending on the transmission delay D and on the time instant when the handover request message is sent from the source radio base station 105s, the estimated frame number offset obtained by expression (3) may vary +/−1 compared to the true frame number offset.

The potential −1 frame number offset error due to the phase difference can be avoided, if the sending of the handover request message 300 is aligned with the start of the frame (or another well defined point in time within the frame 200) and the target radio base station 105t uses, when calculating the offset by expression (3), the next target frame number immediately after the reception of the handover request message 300.

In cases where the transmission delay D cannot be neglected, the frame number offset O can advantageously be calculated by the source radio base station 105s. In order to obtain a better estimate of the frame number offset O, the target radio base station 105t could, in addition to the frame number offset O or $SFN^{(1)}_{target}$, include in the handover response message 310 its own frame number at the time of sending the message. This target frame number is here denoted $SFN^{(2)}_{target}$. The source frame number upon receiving the response message is denoted as $SFN^{(2)}_{source}$. Assuming that the delay from target to source is the same as the delay from source to target, the following relation holds:

$$SFN^{(2)}_{source}=SFN^{(2)}_{target}+D-O. \quad (4)$$

Values of the frame number offset O and the transmission delay D can be calculated by solving the following system of the equations, made up of the equations (2) and (4) given above:

$$SFN^{(1)}_{target}=SFN^{(1)}_{source}+D+O,$$

$$SFN^{(2)}_{source}=SFN^{(2)}_{target}+D-O. \quad (5)$$

When estimating the frame number offset by means of equation system (5), there will be no estimation error due to the transmission delay, as long as the delay is identical in both directions. If the sending of the handover request message 300 is aligned with the start of a source frame, as discussed above, the overestimation error can also be avoided. In this case, the two-way estimation method provided by the system of equations (5) is error-free.

A radio base station 105 may furthermore use an iterative method to estimate the frame number offset O. When using an iterative method, the radio base station 105 would, when a new handover occurs, refine an estimated frame number off-set obtained at past handovers, instead of making a new estimate at each handover. Thereby, the accuracy of the estimate can be further improved. If the number of real handovers is not sufficient for obtaining a sufficiently accurate estimate of the frame number offset between two radio base stations 105, handover preparation could be faked and further values of the frame number offset O could be obtained from such faked handover preparation.

FIG. 5 is a flowchart schematically illustrating a method according to the invention performed in the network part of system 100 (i.e. in the source radio base station 105s, or in the source radio base station 105s in combination with the target radio base station 105t).

In step 500, timing information relating to the timing of handover resources which have been reserved for the handover of a particular user equipment 115 from a source radio base station 105s to a particular target radio base station 105t is obtained by means of a frame number offset between the source cell 105s and the target cell 105t. By obtaining the timing information by means of a frame number offset, the timing information can be expressed in relation to the source frame numbering, known by the user equipment 115, without the need for transmission of any additional messages between the source and target radio base stations 115. Rather, as discussed above, the frame number offset can be obtained from the timing of the transmission/reception of the normal handover signalling. Different implementations of step 500 will be further discussed in relation to FIGS. 6a and 6b.

In step 505, the timing information is transmitted to the user equipment 115 as part of a handover command 315. Providing the timing information to the user equipment 115 will allow for limiting the time period during which a handover resource is reserved to the particular handover procedure, since the user equipment 115 will know at which moments in time the particular handover resource has been reserved for the user equipment 115 and therefore attempt the handover signalling (typically the signalling of synchronisation message 320) at such times. Thus, the handover resources may thus be utilised in a more efficient manner. Since no extra message will have to be transmitted in order to convey the timing information to the user equipment 115, the radio resources are efficiently utilised.

In systems 100 wherein some radio base stations 105 will provide timing information relating to the timing of reserved resources to a user equipment 115 in a handover command 315 upon handover, while other radio base stations 105 will not include such timing information, a radio base station 105 that is capable of providing timing information to a user equipment 115 could preferably inform the user equipment 115 accordingly. Information on whether a particular radio base station 105 provides timing information could for example be signalled to a user equipment 115 upon entry of the user equipment 115 into the cell 110 serviced by the radio base station 105. Alternatively, in a system 100 wherein some radio base stations 105 provide timing information in a handover command 315 and other radio base stations 115 do not, no special information relating to whether or not a radio base station 105 supports the transmission of timing information is transmitted to the user equipments 115 in the system 100, but a default procedure is used by the user equipment 115 in cases when the handover command 315 does not include any timing information. Such default procedure could for example be that a dedicated preamble received by a user equipment 115 in a handover command 315 could be used by the user equipment 315 for the following N time slots.

Figure 6A:
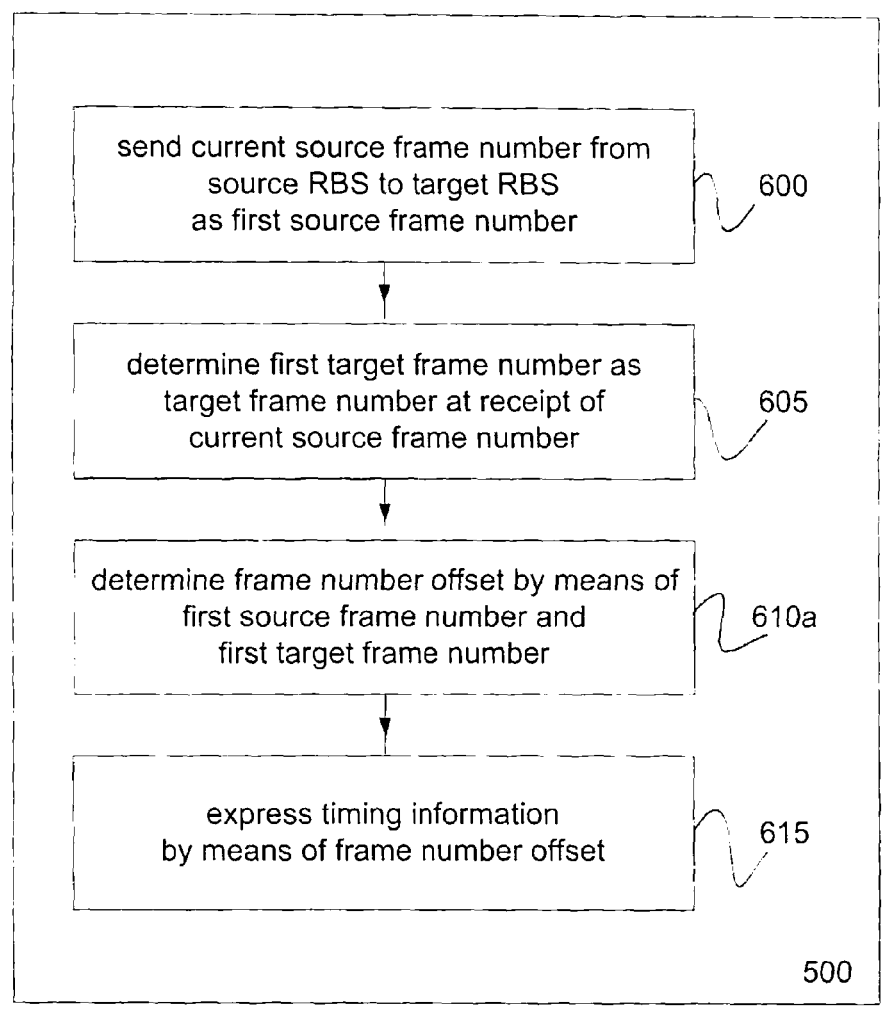
FIG. 6a illustrates a method of obtaining timing information by means of a frame number offset according to the invention.

FIG. 6a illustrates an implementation of step 500, wherein any transmission delay D of the handover request message 300 is neglected. Steps 600-610a of FIG. 6a are performed in order to determine the frame number offset O. In step 600, the first source frame number, $SFN^{(1)}_{source}$, determined as the current source frame number, is transmitted to the target radio base station 105t. The first source frame number can advantageously be sent as part of a handover request message 300. By sending the first source frame number in a handover request message 300, which would have been sent regardless of whether the frame number offset O was to be determined or not, transmission resources will be efficiently used. In step 605, a first target frame number $SFN^{(1)}_{target}$ is determined as the frame number of the target radio base station 105t upon receipt of the first source frame number $SFN^{(1)}_{source}$. In step 610a, a frame number offset O is determined by means of the first source frame number and the first target frame number. This could advantageously be done by use of expression (3).

In step 615, the timing information to be sent to the user equipment 115 in a handover command 315 in step 505 is expressed by means of the frame number offset O determined in step 610a. The timing information has been determined, prior to the entry of step 615, by the target radio base station 105t in terms of the target frame numbering upon allocating the reserved resources to the handover procedure at hand. Since the user equipment 115 is ignorant of the target frame numbering, but has full knowledge of the source frame numbering, the timing information will, in step 615, be expressed in relation to the source frame numbering by use of the frame number offset O. As mentioned above, the timing information could for example be expressed in step 615 in terms of the relevant target source frame number(s) in combination with the frame number offset O; in terms of the frame source number(s) corresponding to the target frame numbering in which the timing information was initially expressed, or in terms of a number of frames starting from for example the time of transmission of the handover command 315.

The timing information could preferably include an expiry time of the reserved resources, indicating when the reservation of resources expires. Furthermore, the timing information could include a start time of the reserved resources. Moreover, the timing information could include information relating to one or more intermittent periods during which the reserved resources will not be reserved to the particular user equipment (cf. FIG. 2b). The timing information may also include information on transmission resource blocks within a frame 200 in which the reserved resources have been reserved.

Steps 605 and 610a could be performed by the target radio base station 105t, in which case the frame number offset O could advantageously be transmitted to the source radio base station 105s in a handover response message 310 (the first target frame number could optionally also be included in such handover response message 310). Step 615 could then also be performed by the target radio base station 105t, in which case the timing information expressed by means of the frame number offset would be transmitted to the source radio base station 105s. Alternatively, step 610a could be performed by the source radio base station 105s. The source radio base station 105s would then receive the first target frame number from the target radio base station 105t, advantageously in a handover response message 310. The source radio base station 105s would then determine the first target frame number from the information received from the target radio base station 105t. In both scenarios, the source radio base station 105s will receive information relating to the first target frame number from the target radio base station 105t—either in terms of the first target frame number itself, or in terms of the frame number offset obtained from the first target frame number (or both). Such information relating to the first target frame number will be referred to as first target frame number information.

As seen in relation to FIG. 6a, the frame number exchange can be one-way only (typically from source radio base station 105s to target radio base station 105t) and the target radio base station 105t calculates the frame number offset O relative to the source cell 110s.

Figure 6B:
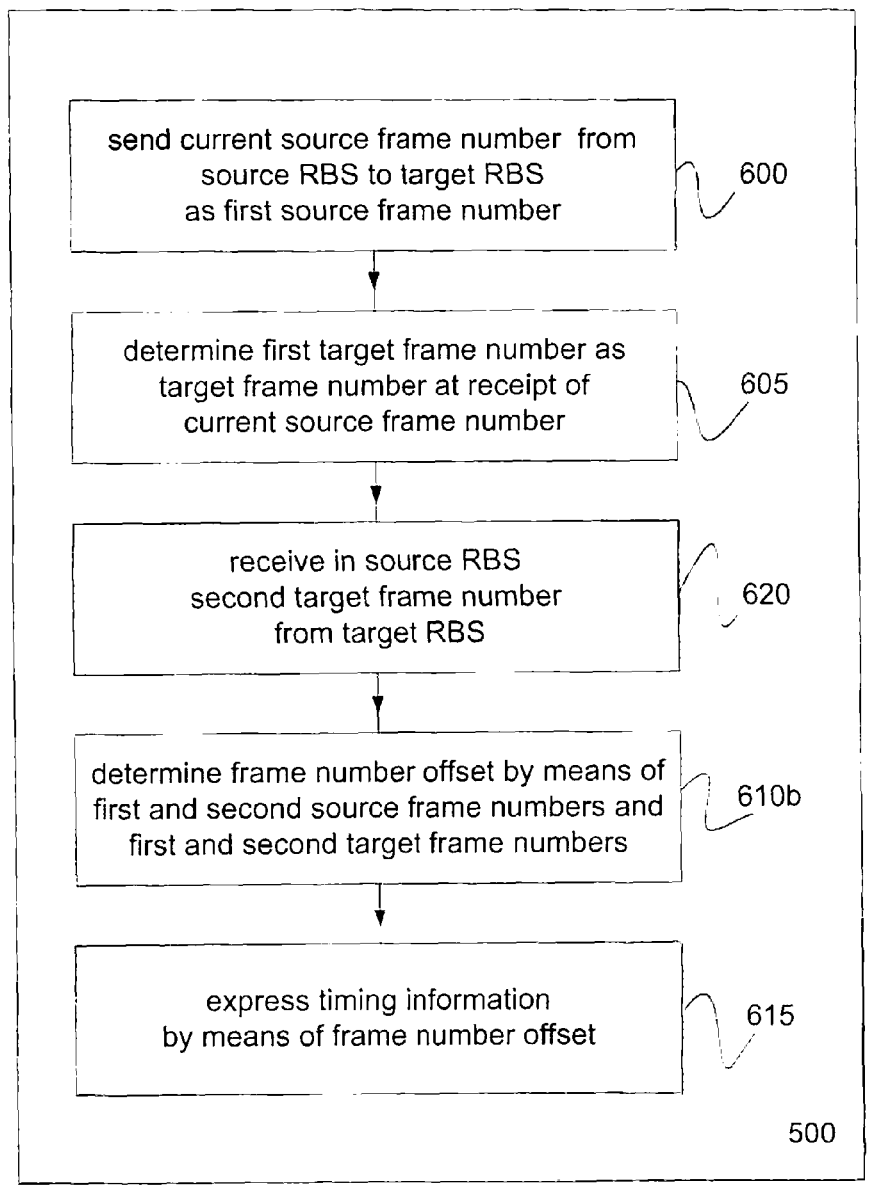
FIG. 6b illustrates another method of obtaining timing information by means of a frame number offset according to the invention.

FIG. 6b schematically illustrates an alternative implementation of step 500, in which a step 620 has been included in the method. In step 620, a second target frame number is received by the source radio base station 105s from the target radio base station 105t (preferably as part of the handover response message 310). The second target frame number is the value of the target frame number upon sending the second target frame number from the target radio base station 105t. The frame number offset O is then determined in step 610, wherein not only the first source and target frame numbers are used for determining the frame number offset O, but also the second source and target frame numbers. The determination performed in step 610b could advantageously be based on solving the system of equations presented in expression (5). The value of the frame number offset O by means of the procedure of FIG. 6b will be independent of the transmission delay D, and an accurate estimation of the frame number offset O can be obtained even if the transmission delay D is not negligible.

The impact of potential errors in the frame number offset estimation should preferably be taken into account in the above described procedure of reserving handover resources to a handover procedure. For example, if there is a risk that the frame number offset O is underestimated, as could e.g. be a case when the frame number offset O is obtained via expression (3) and there is a phase difference between the stream of source frames and the stream of target frames, then this should preferably be taken into account. If there is such a risk of underestimation, and the step 615 of expressing the timing information by means of the frame number offset O is performed at the target radio base station 105t, then the resources should advantageously be reserved for the handover procedure during one or more extra frames 200, not included in the timing information, in order to avoid that the user equipment 115 tries to use a resource that it believes to be reserved for it, but which in reality is not for the user equipment 115. When, on the other hand the 615 is performed by the source radio base station 105s, then the timing information could be expressed in a manner so that the last frame for which the resources have actually been reserved for the handover procedure would not be included in the timing information, so that in fact, if there is no error in the frame number offset estimation, the last frame 200 would not be used. If instead, the source radio base station 105s were to add an extra frame 200 to the frames for which the resource has been reserved, this would have to be communicated to the target radio base station 105t.

When the frame number offset O is calculated by the target radio base station 105t, so that the timing information can be expressed by the target radio base station 105t in relation to the source frame numbering, the timing information relating to the timing of the reserved resources could be included in a part of the handover response message 310 often referred to as the transparent container, which is a part of the handover response message 310 that is transmitted transparently through the source radio base station 105s to the user equipment 115. The source radio base station 105s would in such cases in principle not need to see the result of the frame number offset calculation. The source radio base station 105s may however benefit from knowing the result in order to better predict when the user equipment 115 must be ordered (by means of the handover command 315) to go/switch to the target cell 110t. Hence, the frame number offset O may also be transmitted in a part of the handover response message 310 that will be read by the source radio base station 105s.

In other implementations, when the frame number offset calculation is performed by the source radio base station 105s, the timing of the reserved resources is advantageously transmitted in a part of the handover response message 310 that will be unpacked by the source radio base station 105s.

Figure 7A:
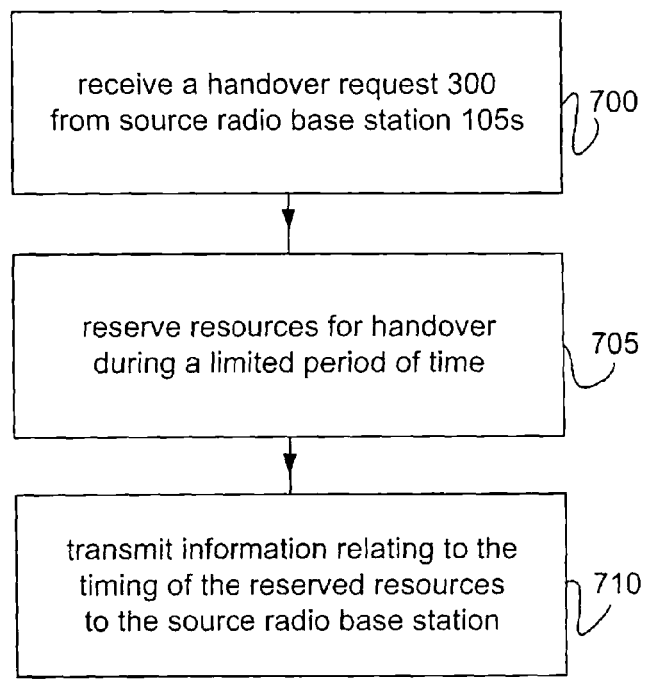
FIG. 7a illustrates a method according to the invention.

FIG. 7a is a flowchart schematically illustrating a method according to the invention performed in a target radio base station 105t. In step 700, handover request 300 is received from a source radio base station 105s. In step 705, handover resources are reserved in target radio base station 105t in response to the receipt of the handover request 300. The handover resources are reserved for a limited period of time only. In step 710, information relating to the timing of the reserved resources, i.e. to the limited period of time during which the reserved resources have been reserved, is transmitted to the source radio base station 105s.

Figure 7B:
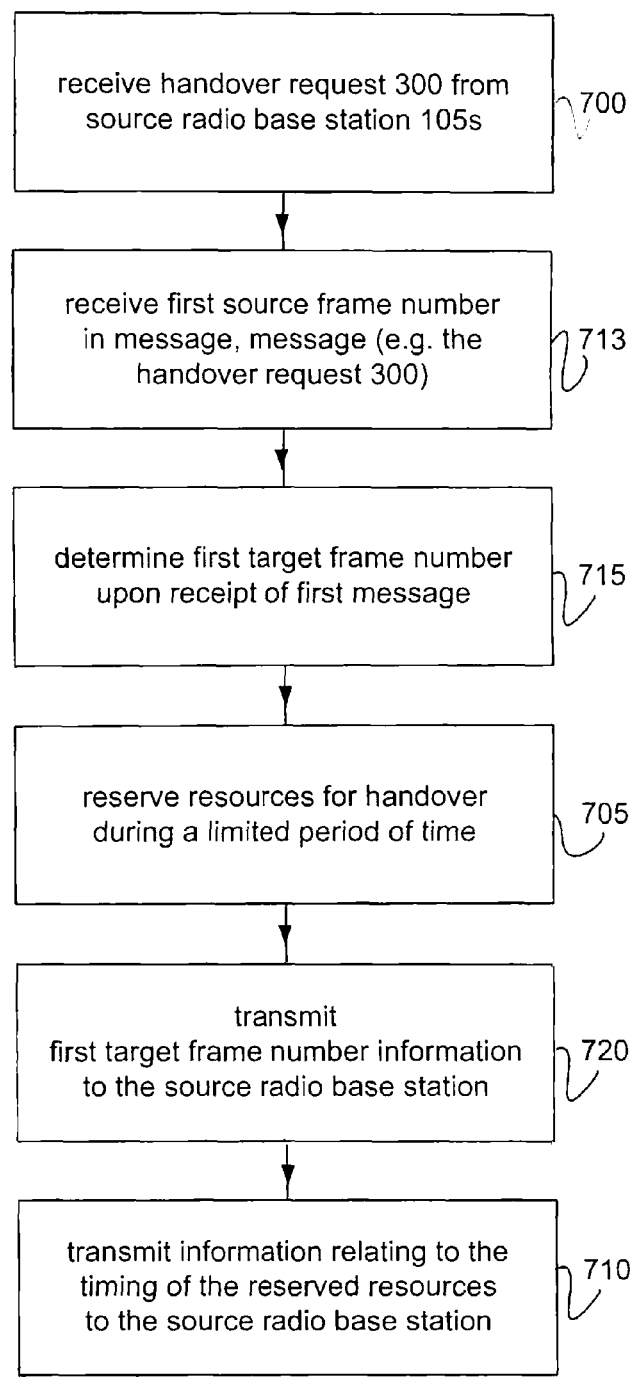
FIG. 7b illustrates a method according to the invention.

FIG. 7b is a flow chart schematically illustrates, in more detail, an embodiment of the method illustrated in FIG. 7a. In step 700, a handover request 300 is received from a source radio base station 105s in a target radio base station 105t. In step 713, a message containing a first source frame number is received from the source radio base station 105s. This message can advantageously be the handover request 300 received in step 700, but could alternatively be a separate message. In step 715, a first target frame number is determined as the current target frame number when the message containing the first source frame number is received. In step 705, resources are reserved for the handover for a limited period of time. In step 720, first target frame number information, obtained from the first target frame number obtained in step 715, is transmitted to the source radio base station 720. The first target frame number information could e.g. include the first target frame number, and/or a frame number offset O determined by means of the first source and target frame numbers, as discussed above. The transmission of the first target frame number information could advantageously be performed in the same message as the transmission of information relating to the timing of the reserved resources performed in step 710, e.g. in the handover response 320, but could alternatively be performed in a separate message. In one implementation of the invention, steps 713, 715 and 720 may be performed separately to the handover procedure, for example at regular intervals, so that neighbouring radio base stations 105 can determine the frame number offset O regardless of whether a handover is requested or not. This may for example be advantageous in an implementation where the value of the frame number offset O between two radio base stations 105 may be refined by interations (cf. faked handover preparations discussed above).

Figure 8:
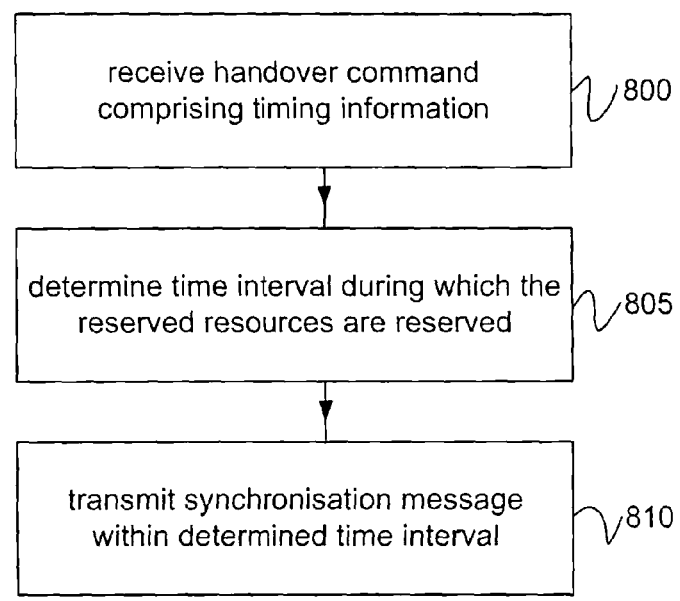
FIG. 8 illustrates a method of obtaining time synchronisation of the user equipment in a target cell.

FIG. 8 is a flowchart schematically illustrating a method according to the invention performed in the user equipment 115. In step 800, a handover command 315 comprising timing information relating to timing of reservation of handover resources is received by the user equipment 115. In step 805, a time interval, during which the reserved resources are reserved, is determined by means of the timing information. In step 810, a synchronisation message 320 is transmitted within the time interval determined in step 805, wherein the synchronisation message 320 uses the reserved resources (e.g. a dedicated preamble) of which information is retrieved from the handover command 315 received in step 800. In a system 100 based on the LTE standard, the synchronisation message 320 could typically be transmitted as part of the random access procedure.

Hence, the timing information is provided to the user equipment 115 as part of the handover command 315. The timing information is derived by means of the frame number offset O, and may in fact include the value of the frame number offset O. The timing information is used by the user equipment 115 to derive the location of the dedicated resources that have been reserved for it by the target cell 110t. Thus, the user equipment 115 can receive all information that is necessary for identifying the reserved resources as part of the handover command 315. This aspect of the invention enables the user equipment 115 to get (initial) frame number synchronisation in the target cell 110t and thereby to obtain timing knowledge of the pre-allocated dedicated resource to be used for the initial access in the target cell 110t.

If an attempt to perform random access in step 810 fails, a further attempt may be performed, if there is still time available for which resources have been reserved. If, for some reason, the user equipment 115 fails to establish contact with the target radio base station 105t during the time period during which the handover resources have been reserved (i.e. during the time period specified by means of the timing information), the user equipment 115 may perform handover signalling to the target radio base station 105t in a conventional contention-based manner.

Figure 9:
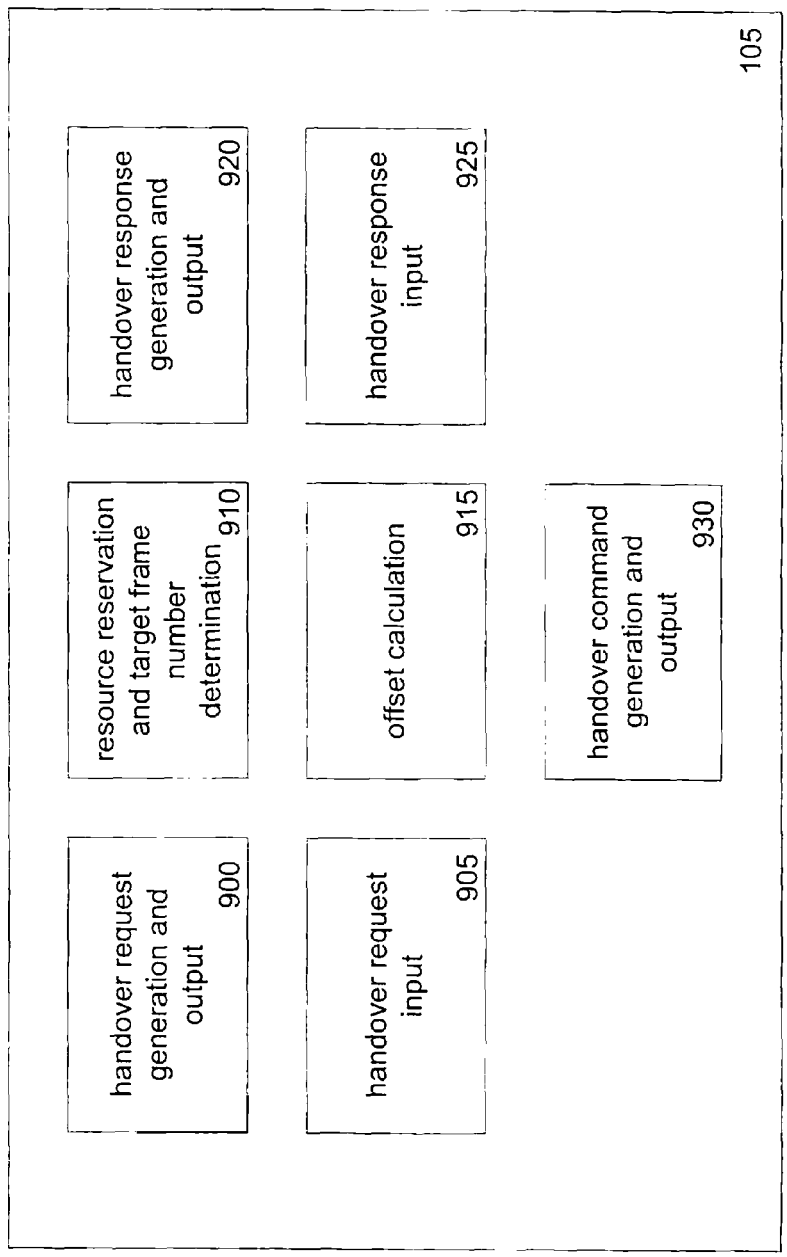
FIG. 9 schematically illustrates a radio base station according to the invention.

FIG. 9 schematically illustrates a radio base station 105 according to the invention. The radio base station 105 in FIG. 9 includes functionality of both the source radio base station 105s and the target radio base station 105t described above. This would most often be the case, although radio base stations 105 having the functionality of either a source radio base station 105s or a target radio base station 105t could also be contemplated.

The radio base station 105 of FIG. 9 comprises a handover request generation and output arrangement 900 adapted to generate and transmit, to a neighbouring radio base station 105, a handover request message 300 including information on the first source frame number, as discussed above. Radio base station 105 further comprises a handover request input 905 adapted to receive a handover request message 300 from a neighbouring radio base station 105 and to retrieve information on the first source frame number from a handover request message 300. Radio base station 105 further comprises a resource reservation and target frame number determination arrangement 910, connected to the handover request input 905 and adapted to reserve resources in the cell 110 served by the radio base station 105 for the handover of a user equipment 115 in accordance with a handover request 300 received by the handover request input 905 and to determine the target frame number. Radio base station 105 further comprises an offset calculation arrangement 915 arranged to calculate the frame number offset between the source radio base station 105s and the target radio base station 105t; a handover response generation and output arrangement 920 arranged to generate and transmit, to a source radio base station 105s, a handover response message 310; a handover response input 925 arranged to receive a handover response 310; and a handover command generation and output arrangement 930 arranged to generate and transmit, to the user equipment 115, a handover command 315.

Depending on whether the offset calculation arrangement 915 should perform frame number offset calculations when the radio base station 105 acts as a source or a target radio base station, the offset calculation arrangement 915 should either be connected to the handover request input 905 and the resource reservation arrangement 910 (if acting in target radio base station mode), or to the handover response input 925 (if acting in source radio base station mode). The offset calculation is preferably arranged to retrieve the current frame number of the radio base station 105, and to perform frame offset calculations, for example in accordance with expressions (3) above (in target radio base station mode) or expression (5) above (in source radio base station mode).

If the handover response generation and output arrangement 920 is arranged to include timing information in a handover response message 920 (for example in a transparent container), then the handover command generation and output 930 is preferably connected to the handover response input 925 and arranged to forward the timing information (for example in a transparent container in a transparent manner) to the user equipment 115. If the offset calculation 915 is arranged to act when the radio base station 105 is operating in source radio base station mode, then the handover command generation and output arrangement 930 is advantageously connected to the offset calculation arrangement 915 to receive the frame number offset O, and to the handover response input 925 to receive information on the reserved resources—the handover command generation and output arrangement 930 is then preferably arranged to express the timing information in a suitable manner in relation to the source frame numbering.

The handover request generation and output arrangement 900, the handover request input 905, the resource reservation arrangement 910, the offset calculation arrangement, the handover response generation and output arrangement 920, the handover response input arrangement 925, and the handover command generation and output 930 are preferably implemented as suitable hardware and software.

Figure 10:
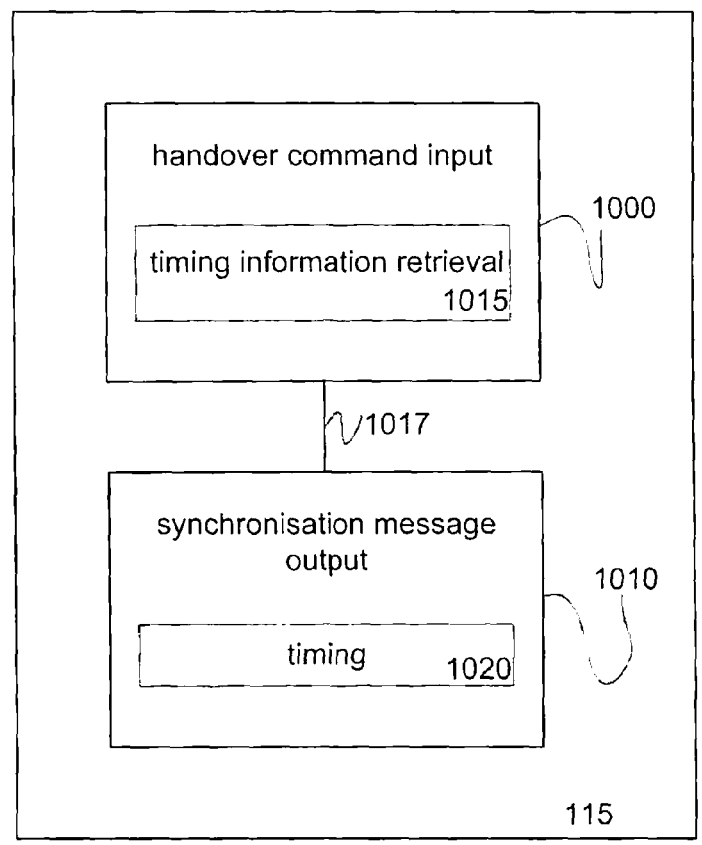
FIG. 10 schematically illustrates a user equipment according to the invention.

FIG. 10 illustrates a user equipment 115 comprising a handover command input 1000 adapted to receive a handover command 315 from a source radio base station 105s, and a synchronisation message output 1010 adapted to transmit a synchronisation message 320 to a target radio base station in response to the receipt of a handover command 315. The handover command input 1000 comprises a timing information retrieval mechanism 1015 adapted to retrieve, from a handover command 315, timing information relating to the timing of resources reserved for the handover of the user equipment 115 to a target radio base station 105t. The handover command input 1000 is connected to the synchronisation message output 1010 by means of a connection 1020, over which a signal indicative of timing information retrieved from a handover command 315 may be sent. The synchronisation message output 1010 comprises a timing mechanism 1020, adapted to use the timing information to ensure that a synchronisation message 320 is transmitted to a target radio base station 105t in accordance with the timing information.

The above described invention provides a simple mechanism to indicate the timing of the reserved resource in the target cell 110t to the user equipment 115 during a handover. According to the invention, the user equipment 115 can receive all necessary timing information of the reserved resource from the network in a handover command 315, and does not have to read system information in the target cell 110t prior to accessing the target cell 110t. Hereby, increased interruption times due to reading the broadcast channel can be avoided.

The existing handover signalling messages can preferably be reused to convey frame number information between neighbouring radio base station 105, which frame number information is then used to estimate the frame number offset O between the corresponding cells.

By use of the present invention, frame number synchronization for timing of reserved resources at handover may be obtained. Such reserved resources are applied e.g. at random access procedures and can for example be the dedicated preamble on the Random Access channel in a system 100 based on the LTE standard. In other systems, other types of resources may reserved for a user equipment 115 for the handover to a target cell 110t. In a system based on the Global System for Mobile communications (GSM) standard, for example, a dedicated access channel (time slot) is allocated to a user equipment 115 for performing access to the target cell. The invention will also apply to such systems.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A method of performing handover of a user equipment from a source radio base station to a target radio base station in a mobile radio communications system, wherein a handover command comprising information relating to resources reserved for the handover is sent to the user equipment from the source radio base station, wherein the handover command further comprises timing information relating to the timing of the reserved resources; and wherein the timing information is obtained using a frame number offset between a source cell and a target cell, the method comprising:
   sending information on a first source frame number to the target radio base station in a first message, where the first source frame number is the frame number of the source radio base station upon sending said information on the first source frame number; and
   receiving a second message from the target radio base station, the second message comprising first target frame number information, wherein the first target frame number information has been obtained by the target radio base station by determining a first target frame number as the frame number of the target radio base station upon receipt of the first message.

2. The method of claim 1, wherein
the first message is a handover request message and/or the second message is a handover response message.

3. The method of claim 1, wherein
the sending of the information on a first source frame number is time-aligned with a frame.

4. The method of claim 1, wherein
the first target frame number information received in the second message comprises information on the frame number offset, wherein the frame number offset has been determined by the target radio base station.

5. The method of claim 1,
wherein the first target frame number information received from the target radio base station comprises information on the first target frame number;
the method further comprising:
receiving a second target frame number from the target radio base station, wherein the second target frame number has been determined by the target radio base station as the target frame number upon sending of the second target frame number; and
the first target frame number and a second target frame number are sent from the target radio base station to the source radio base station as part of a handover response message;

determining a second source frame number as the source frame number upon receipt of the second target frame number; and determining the frame number offset based on the first and second source frame numbers and the first and second target frame numbers.

6. The method of claim 1, wherein the timing information is expressed in terms of the frame number offset.

7. The method of claim 1, wherein
the timing information is expressed as at least one frame number in terms of the source frame numbering.

8. The method of claim 1, wherein
the timing information is expressed as a certain number of frames for which the reserved resources are reserved following the current source radio base station frame.

9. The method of claim 1, further comprising
determining the timing of the sending of the handover command by use of the frame number offset.

10. The method of claim 1, wherein
the timing information comprises the expiry time of the reserved resources.

11. The method of claim 1, further comprising
informing the user equipment of the fact that the timing information in the handover command is obtained using a frame number offset between the source cell and the target cell.

12. A radio base station for communication with a user equipment in a mobile radio communications system, the radio base station comprising a first output for generating and transmitting a handover command to a user equipment when handover of the user equipment to a neighbouring radio base station is desired; a second output for transmitting, to a neighbouring radio base station, a handover request; and a third output for transmitting, to a neighbouring radio base station, a handover response in response to a received handover request; wherein a handover response and a handover command comprise information relating to resources reserved for a user equipment; the radio base station comprising:
the second output is including, in a handover request, information on a first source frame number, the first source frame number being determined in dependence of the current frame number of the radio base station;
the third output is including, in the handover response, first target frame number information, wherein the first target frame number information has been determined in dependence of the frame number of the radio base station upon receipt of a handover request from a neighbouring radio base station, the handover request including a second source frame number;
the first output is including, in the handover command, information relating to the timing of the reserved resources; wherein the timing information has been obtained by means of a frame number offset between the radio base station and a neighbouring radio base station;
the radio base station further comprising:
an offset calculation arrangement for calculating a frame number offset in dependence of a source frame number and a target frame number information, wherein one of the source frame number and the target frame number information relate to the radio base station and the other relates to a neighbouring radio base station.

13. The radio base station of claim 12, further comprising a resource reservation and target frame number determination arrangement for reserving resources in response to a handover request in a manner so that the resources are reserved for a limited period of time, and to determine a first target frame number upon receipt of a handover request.

14. A radio apparatus capable of initiating handover of a user equipment in a mobile radio communications system, the apparatus comprising:
a handover command arrangement configured to transmit a handover command to a user equipment, the handover command comprising information relating to resources reserved for a handover and timing information relating to a timing of the reserved resources, wherein the timing information is determined based on a frame number offset between a source cell of the handover and a target cell of the handover;
a handover request arrangement configured to send information on a first source frame number to a target radio base station in a first message, wherein the first source frame number comprises a frame number of the source radio base station when the source radio base station sends said information on the first source frame number; and
a handover response input configured to receive a second message from the target radio base station, the second message comprising first target frame number information obtained by the target radio base station by determining a frame number of the target radio base station upon receipt of the first message.

15. The apparatus of claim 14, wherein the first message comprises a handover request message and/or the second message comprises a handover response message.

16. The apparatus of claim 14, wherein the handover request arrangement is configured to send the information on a first source frame number time-aligned with a frame.

17. The apparatus of claim 14, wherein the first target frame number information received in the second message comprises information on the frame number offset, wherein the frame number offset has been determined by the target radio base station.

18. The apparatus of claim 14, wherein the first target frame number information received from the target radio base station comprises information on the first target frame number, and wherein the handover response input is further configured to receive a second target frame number from the target radio base station, wherein the second target frame number has been determined by the target radio base station as the target frame number upon sending of the second target frame number, and wherein the apparatus is further configured to:
determine a second source frame number as the source frame number upon receipt of the second target frame number; and
determine the frame number offset based on the first and second source frame numbers and the first and second target frame numbers.

19. The apparatus of claim 14, wherein the timing information is expressed in terms of the frame number offset.

20. The apparatus of claim 14, wherein the timing information is expressed as at least one frame number in terms of the source frame numbering.

21. The apparatus of claim 14, wherein the timing information is expressed as a certain number of frames for which the reserved resources are reserved following the current source radio base station frame.

22. The apparatus of claim 14, wherein the handover command arrangement is further configured to determine a timing for sending of the handover command by use of the frame number offset.

23. The apparatus of claim 14, wherein the timing information comprises an expiry time of the reserved resources.

24. The apparatus of claim 14, wherein the apparatus is configured to inform the user equipment that the timing information in the handover command is obtained using a frame number offset between the source cell and the target cell.

* * * * *